US012761675B2

(12) United States Patent
Ayyagari

(10) Patent No.: US 12,761,675 B2
(45) Date of Patent: Oct. 13, 2026

(54) DUAL FEEDBACK VOLTAGE REGULATOR

(71) Applicant: Quantefi Corporation, Detroit, MI (US)

(72) Inventor: Sriramasubramanya Ayyagari, Phoenix, AZ (US)

(73) Assignee: Quantefi Corporation, Detroit, MI (US)

(*) Notice: Subject to any disclaimer, the term of this patent is extended or adjusted under 35 U.S.C. 154(b) by 106 days.

(21) Appl. No.: 18/496,726

(22) Filed: Oct. 27, 2023

(65) Prior Publication Data

US 2024/0143003 A1 May 2, 2024

Related U.S. Application Data

(60) Provisional application No. 63/381,274, filed on Oct. 27, 2022.

(51) Int. Cl.
*G05F 1/46* (2006.01)
*G05F 1/618* (2006.01)

(52) U.S. Cl.
CPC .............. *G05F 1/468* (2013.01); *G05F 1/618* (2013.01)

(58) Field of Classification Search
CPC ........ G05F 3/18; G05F 3/185; G05F 3/00–30; G05F 1/462; G05F 1/465; G05F 1/468; G05F 1/56; G05F 1/575; G05F 1/562; G05F 1/565; G05F 1/567; G05F 1/569; G05F 1/571; G05F 1/573; G05F 1/5735; G05F 3/10; G05F 3/16; G05F 3/20; G05F 3/26; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/463; G05F 1/46; G05F 1/461
See application file for complete search history.

(56) References Cited

U.S. PATENT DOCUMENTS

| | | | | |
|---|---|---|---|---|
| 6,188,212 | B1 * | 2/2001 | Larson | G05F 1/56 323/281 |
| 7,564,299 | B2 * | 7/2009 | Shor | G05F 1/565 327/540 |
| 11,036,247 | B1 * | 6/2021 | Wei | G05F 1/575 |
| 11,526,186 | B2 * | 12/2022 | Chang | G05F 1/562 |
| 11,573,585 | B2 * | 2/2023 | Wang | G05F 1/59 |
| 11,940,829 | B2 * | 3/2024 | Guiraud | G05F 1/575 |

(Continued)

OTHER PUBLICATIONS

International Search Report and Written Opinion for PCT Application No. PCT/US2023/078098 mailed on Feb. 27, 2024, 11 Pages.

*Primary Examiner* — Crystal L Hammond
*Assistant Examiner* — Nusrat Quddus
(74) *Attorney, Agent, or Firm* — Jason W. Croft; Buchalter

(57) ABSTRACT

A voltage regulator may comprise an output node, a pass device, a first feedback circuit, and a second feedback circuit. The output node may be operable to be coupled to a load. The pass device may be operable to pass current to the output node based on a voltage applied to the pass device, wherein the pass device comprises a p-channel transistor. The first feedback circuit may be operable to adjust the voltage applied to the pass device based on an output node voltage. The second feedback circuit may be operable to adjust the voltage applied to the pass device based on a change to the output node voltage.

20 Claims, 8 Drawing Sheets

(56) References Cited

U.S. PATENT DOCUMENTS

| | | | | |
|---|---|---|---|---|
| 12,032,397 | B2 * | 7/2024 | Kao | G05F 1/565 |
| 12,153,459 | B2 * | 11/2024 | Xiao | G05F 1/563 |
| 2005/0225306 | A1 | 10/2005 | Oddoart et al. | |
| 2008/0265856 | A1 | 10/2008 | Takada et al. | |
| 2013/0285631 | A1 | 10/2013 | Bisson et al. | |
| 2014/0340058 | A1 * | 11/2014 | Wang | H02M 1/15<br>323/268 |
| 2015/0002110 | A1 | 1/2015 | Singh et al. | |
| 2018/0239380 | A1 | 8/2018 | Ciomaga et al. | |
| 2020/0225689 | A1 * | 7/2020 | Vannorsdel | G05F 1/565 |

* cited by examiner

DUAL FEEDBACK VOLTAGE REGULATOR

RELATED APPLICATION

This application claims the benefit of U.S. Provisional Application No. 63/381,274, filed Oct. 27, 2022, the disclosure of which is incorporated herein by reference in its entirety.

The examples discussed in the present disclosure relate to a voltage regulator and in particular to feedback devices, circuits, and passing devices for a load.

BACKGROUND

Unless otherwise indicated herein, the materials described herein are not prior art to the claims in the present application and are not admitted to be prior art by inclusion in this section.

Voltage regulators, such as low dropout (LDO) voltage regulators (LDO), may be used in various applications, such as for lower power operations. In some circumstances, an on-chip LDO voltage regulator may be used to reduce area and costs associated with the LDO voltage regulator.

The subject matter claimed in the present disclosure is not limited to examples that solve any disadvantages or that operate only in environments such as those described above. Rather, this background is only provided to illustrate one example technology area where some examples described in the present disclosure may be practiced.

SUMMARY

A voltage regulator may include an output node operable to be coupled to a load; a pass device operable to pass current to the output node based on a voltage applied to the pass device; a first feedback circuit operable to adjust the voltage applied to the pass device based on an output node voltage; and a second feedback circuit operable to adjust the voltage applied to the pass device based on a change to the output node voltage. The pass device may include a p-channel transistor.

A voltage regulator may include an output node operable to be coupled to a load; a pass device operable to pass current to the output node based on a voltage applied to the pass device; a first feedback circuit operable to adjust the voltage applied to the pass device based on an output node voltage; a second feedback circuit operable to reduce an impedance of the output node; and a circuit operable to increase a phase margin of the voltage regulator. The pass device may include a p-channel transistor.

A voltage regulator may include an output node operable to be coupled to a load; a pass device operable to pass current to the output node based on a voltage applied to the pass device; a first feedback circuit operable to adjust a voltage output to the pass device based on an output node voltage; a second feedback circuit comprising a second feedback circuit first n-channel transistor and a second feedback circuit second n-channel transistor; and a circuit comprising one or more circuit transistors in a mirror configuration to increase one or more of a power supply rejection ratio (PSRR) bandwidth or a transient response of the voltage regulator. The pass device may include a p-channel transistor.

The objects and advantages of the examples will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example examples will be described and explained with additional specificity and detail through the use of the accompanying drawings in which.

DESCRIPTION OF EMBODIMENTS

Figure 1:
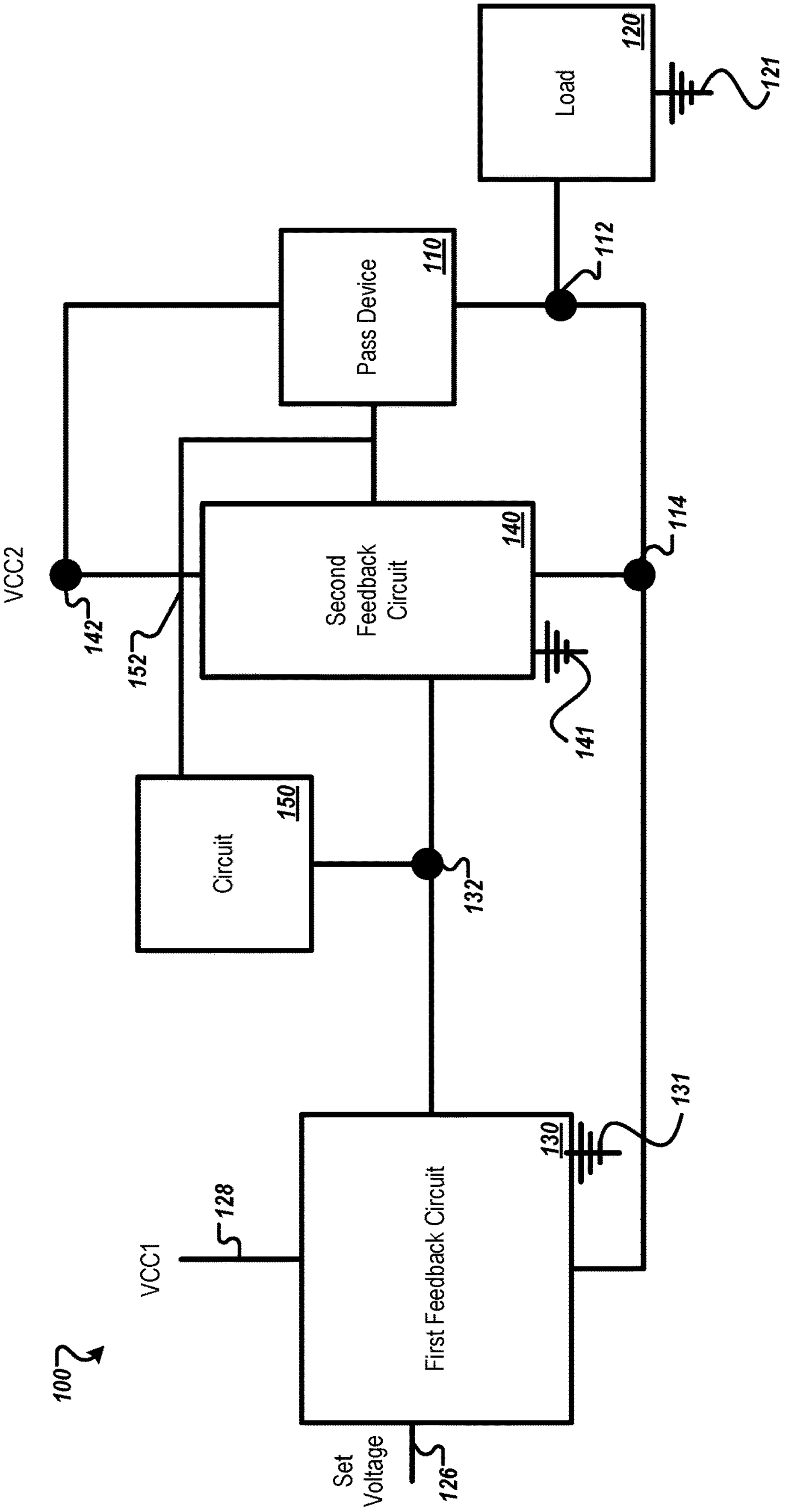
FIG. 1 illustrates an example voltage regulator circuit.

Voltage regulators, such as a low dropout (LDO) voltage regulators, may be used to provide power for lower power operations of electronic components. LDO voltage regulators may be constructed using metal-oxide-semiconductor field-effect transistor (MOSFET) transistors. In some circumstances, LDO voltage regulators may include p-channel MOSFET transistors, referred to in this disclosure as p-channel metal-oxide-semiconductor (PMOS) transistors. For example, the LDO voltage regulators may include a PMOS transistor as a pass device. Using a PMOS transistor may provide for lower power operation because the difference between a supply voltage and an output voltage may be smaller than a difference between a supply voltage and an output voltage when using a n-channel MOSFET transistor, referred to in this disclosure as an n-channel metal-oxide-semiconductor (NMOS) transistor.

Using a PMOS transistor as a pass device in a LDO voltage regulator may result in high impedance at an output mode of the LDO voltage regulator. Alternately or additionally, using a PMOS transistor as a pass device may result in a dominant pole being external to the LDO voltage regulator and thus the dominant pole being affected by changes in a load capacitance and equivalent load resistance of a load coupled to the LDO voltage regulator.

Some examples described in the current disclosure provide a LDO voltage regulator with additionally circuitry to reduce the impedance at the output. Alternately or additionally, some examples describe a LDO voltage regulator with additionally circuitry that allows for a dominant pole of the LDO voltage regulator to be internal to the LDO voltage regulator. For example, a LDO voltage regulator may include first and second feedback circuits. The first feedback circuit may include an amplifier and a feedback voltage provided to the amplifier. The amplifier may adjust a voltage that results in an adjustment to the pass device and thus an adjustment of a voltage on the output node of the LDO voltage regulator.

In some examples, the second feedback circuit may include a voltage follower configuration and act as a buffer between the amplifier and the pass device of the LDO voltage regulator. In these and other examples, the second feedback circuit may be operable to create a low impedance at the output of the pass device.

Alternately or additionally, the second feedback circuit may draw current from the pass device when there is no current being drawn by a load of the LDO voltage regulator, which may help to improve stability of the LDO voltage regulator and help to maintain the pass device in the saturation region when no current is being drawn by the load.

Alternately or additionally, the second feedback circuit may isolate the pass device and output from the amplifier of the first feedback circuit which may allow for a dominant pole to be configured for the LDO voltage regulator that is not affected by changes in the load.

Alternately or additionally, the second feedback circuit may help to improve a transient response of the LDO voltage regulator. Alternately or additionally, the second feedback circuit may help to improve a power supply rejection ratio (PSRR) of the LDO voltage regulator at frequencies higher such that the LDO voltage regulator has a PSRR equivalent to a PSRR where a pass device is a n-channel transistor. In some examples, the second feedback circuit may allow the pass device to be a p-channel transistor while allowing the voltage regulator circuit to emulate an n-channel transistor for the pass device.

As illustrated in FIG. 1, a voltage regulator circuit 100 may include one or more of an output node 112, a pass device 110, a first feedback circuit 130, a second feedback circuit 140, or a circuit 150. The output node 112 may be operable to be coupled to a load 120 (which may be coupled to ground 121). The pass device 110 may be operable to pass current to the output node based on a voltage applied to the pass device. The pass device 110 may be a p-channel transistor. Alternatively or in addition, the pass device 110 may be an n-channel transistor. The first feedback circuit 130 may be operable to adjust the voltage applied to the pass device 110 based on an output node 112 voltage. The second feedback circuit 140 may be operable to adjust the voltage applied to the pass device 110 based on a change to the output node 112 voltage. For purposes of this disclosure, "coupled" may be "directly coupled" or "indirectly coupled." The components may be coupled together (directly or indirectly) as shown in FIG. 1.

The voltage regulator circuit 100 may be operable to supply a voltage and/or a current to the load 120 using the output node 112. An amount of the current may depend on an operation of the load 120. The load 120 may be a circuit operable to perform any type of operation that uses a voltage level supplied by the voltage regulator circuit 100 and/or a current level supplied by the voltage regulator circuit 100. For example, the load 120 may be a voltage controlled oscillator.

The voltage supplied to the load 120 at the output node 112 may be equal to or approximately equal to a set voltage. In these and other examples, the voltage regulator circuit 100 may be operable to adjust an amount of current supplied to the output node 112 to maintain the voltage on the output node 112 at or approximately at the set voltage. For purposes of this disclosure, "approximately" may refer to a value that may be within a margin of error of less than one or more of: 10% of a value, 8% of a value, 5% of a value, 3% of a value, 2% of a value, 1% of a value, or the like.

The pass device 110 may be an active device that may be operable to pass current from the power source VCC2 142 to the output node 112 and the load 120. For example, the pass device 110 may pass an amount of current based on a voltage signal provided by the second feedback circuit 140. In some examples, the voltage signal may be based on a voltage signal generated by the first feedback circuit 130. In these and other examples, the second feedback circuit 140 may be configured as a buffer circuit between the first feedback circuit 130 and the output node 112.

The voltage signal provided to the pass device 110 from the second feedback circuit 140 may be based on a change to the voltage at the output node 112. In some examples, the second feedback circuit 140 may cause a change in the voltage signal provided to the pass device 110 before a change to the voltage signal may be caused by the first feedback circuit 130. In these and other examples, the second feedback circuit 140 may direct an initial change in the voltage signal provided to the pass device 110 and after a change in the voltage signal provided by the second feedback circuit 140, the first feedback circuit 130 may provide a change in the voltage signal that may be buffered by the second feedback circuit 140. The changes in the voltage signal provided to the pass device 110 may cause the pass device 110 to adjust an amount of current provided to the output node 112 and thereby adjust the voltage at the output node 112.

The pass device 110 may be a metal oxide silicon field effect transistor (MOSFET). In these and other examples, the pass device 110 may be a p-channel MOSFET device. Using a p-channel MOSFET device as the pass device 110 may allow the voltage regulator circuit 100 to have a lower dropout voltage. For example, using the p-channel MOSFET device may allow the voltage difference between the VCC2 142 and the output node 112 to be in saturation voltage of the p-channel MOSFET device which may be lower than a voltage difference when an n-channel MOSFET device is used as the pass device 110. Furthermore, based on the configuration of the pass device 110, the voltage of the voltage common collector 1 (VCC1) 128 and the voltage common collector 2 (VCC2) 142 may be the same or approximately the same. Alternately or additionally, VCC1 128 and VCC2 142 may be the same power supplies and may not be different power supplies.

The first feedback circuit 130 may be operable to obtain an indication of the voltage at the output node 112. The first feedback circuit 130 may compare the indication of the voltage at the output node 112 to a set voltage 126. The set voltage 126 may be a voltage that is a selected voltage for the output node 112 or based on a selected voltage for the output node 112. The first feedback circuit 130 may generate a first output voltage 132 that may adjust the voltage signal provided to the pass device 110. In these and other examples, the first output voltage may be provided to the second feedback circuit 140 and the circuit 150. The first feedback circuit 130 may be operable to receive feedback from the output node 112. The first feedback circuit 130 may be coupled to ground 131.

The second feedback circuit 140 may be operable to obtain the first output voltage 132 from the first feedback circuit 130. The second feedback circuit 140 may generate the voltage signal 114 provided to the pass device 110 based on the first output voltage 132. In these and other examples, the second feedback circuit 140 may act as a buffer circuit between the first feedback circuit 130 and the pass device

110. As such, the second feedback circuit 140 may adjust the voltage signal 114 in response to the first output voltage 132 provided by the first feedback circuit 130. The second feedback circuit may be coupled to ground 141.

The second feedback circuit 140 may be operable to draw or source a current from the pass device 110. As a result, the second feedback circuit 140 may help to maintain the pass device 110 in a saturation region of operation when less than a selected amount of current is drawn from the load 120 because the second feedback circuit 140 may draw a current from the pass device 110. For purposes of this disclosure, a “selected amount of current” may be less than one or more of: 100 mA, 10 mA, 1 mA, 0.1 mA, 1 μA, or the like.

The second feedback circuit 140 may be operable to facilitate a reduced impedance at the output node 112 by using a voltage follower. For example, the second feedback circuit 140 may reduce an impedance at the output node 112 using a voltage follower configuration of a MOSFET transistor, which may be a p-channel transistor or an n-channel transistor. In some examples, reducing the impedance may improve a transient performance of the voltage regulator circuit 100.

The second feedback circuit 140 may be operable to facilitate a dominant pole for the voltage regulator circuit 100 that may facilitate increased stability in response to a load change. The increase in stability may be measured relative to a stability measured without using the dominant pole.

The second feedback circuit 140 may buffer the circuit 150 from the output node 112. As such, the second feedback circuit 140 may allow the circuit 150 to provide a dominant pole for the voltage regulator circuit 100 with respect to a frequency response of the voltage regulator circuit 100 and reduce an effect of a change of the load 120 with respect to the frequency response of the voltage regulator circuit 100. For example, a pole for the voltage regulator circuit 100 located at the output node 112 may see a lower impedance due to the second feedback circuit 140 and thus may be located at a higher frequency allowing the pole of the circuit 150 to be the dominant pole.

The second feedback circuit 140 may be operable to adjust the output node 112 based on a first output voltage 132 from the first feedback circuit 130 and the change to the output node 112 voltage.

In some examples, the second feedback circuit 140 may be further operable to adjust the voltage signal 114 provided to the pass device 110 independent of the first feedback circuit 130. In these and other examples, the second feedback circuit 140 may adjust the voltage signal provided to the pass device 110 without a change from the first output voltage 132 provided to the second feedback circuit 140 from the first feedback circuit 130. Alternately or additionally, the second feedback circuit 140 may be operable to adjust the voltage signal 114 in addition to a change to the first output voltage 132 provided to the second feedback circuit 140 from the first feedback circuit 130. For example, in response to a change in the voltage at the output node 112, one or more of the first feedback circuit 130 and the second feedback circuit 140 may direct a response to the voltage signal 114 provided to the pass device 110. In these and other examples, the second feedback circuit 140 may have a faster response than the first feedback circuit 130 and may direct a change to the voltage signal 114 before the first feedback circuit 130 directs a change to the voltage signal 114. In these and other examples, after directing the change, the second feedback circuit 140 may obtain the first output voltage 132 from the first feedback circuit 130. The second feedback circuit 140 may adjust the voltage signal 114 based on one or more of the first output voltage 132 from the first feedback circuit 130 and based on the change to the voltage at the output node 112 as determined by the second feedback circuit 140 independent from the first feedback circuit 130. Thus one or more of the first feedback circuit 130 and the second feedback circuit 140 may act as a gain loop for adjusting the pass device 110.

The circuit 150 may be operable to provide a dominant pole for the voltage regulator circuit 100. Based on the placement of the circuit 150 between the second feedback circuit 140 and the gate of the pass device 110, an effect of current variations of the load 120 may be reduced for a pole generated by the circuit 150. The circuit 150 may be further operable to generate a zero for the voltage regulator circuit 100. The zero may help to reduce the effect of the pole and thereby increase the phase margin of the voltage regulator circuit 100.

The circuit 150 may be coupled to the first output voltage 132 received from the first feedback circuit 130. The circuit may be coupled to the second feedback circuit 140 and the pass device 110 (e.g., on connection 152). In some examples, the circuit 150 may include the elements illustrated in FIG. 2. Alternately or additionally, the circuit 150 may include the elements illustrated in FIG. 4.

Modifications, additions, or omissions may be made to the voltage regulator circuit 100 without departing from the scope of the present disclosure. For example, the voltage regulator circuit 100 may not include the circuit 150.

Alternatively or in addition, a voltage regulator circuit 100 may include one or more of an output node 112, a pass device 110, a first feedback circuit 130, a second feedback circuit 140, or a circuit 150. An output node 112 may be operable to be coupled to a load 120. The pass device 110 operable to pass current to the output node 112 based on a voltage 142 applied to the pass device 110. The pass device 110 may include a p-channel transistor. The first feedback circuit 130 may be operable to adjust the voltage 142 applied to the pass device 110 based on an output node 112 voltage. The second feedback circuit 140 may be operable to reduce an impedance of the output node 112. The circuit 150 may be operable to increase a phase margin of the voltage regulator circuit 100. The first feedback circuit 130 may include one or more of a first resistor, a second resistor, or an amplifier. The second feedback circuit 140 may include a voltage follower.

Figure 2:
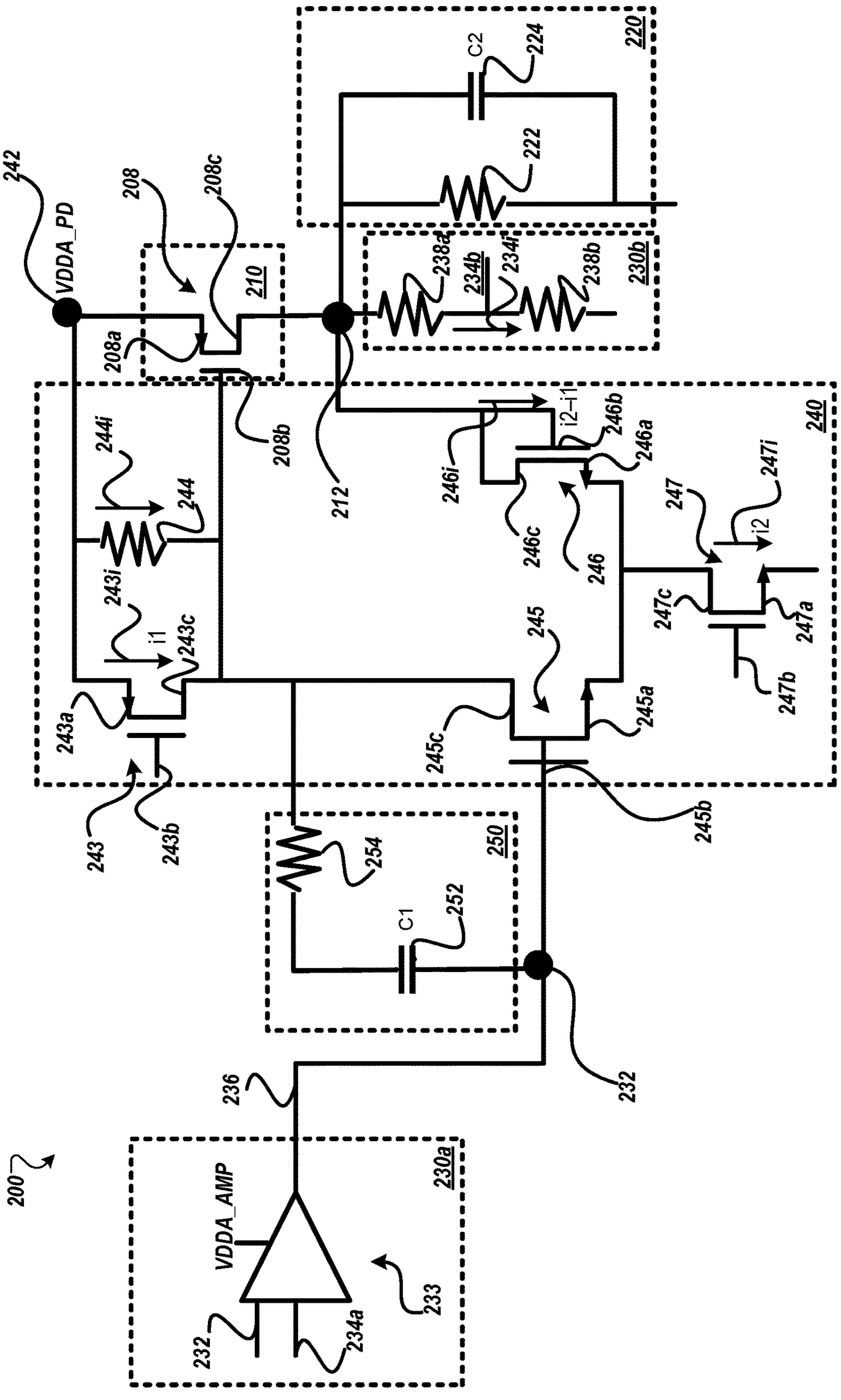
FIG. 2 illustrates another example voltage regulator circuit.

As illustrated in FIG. 2, a voltage regulator circuit 200 may include one or more of an output node 212, a load 220, a pass device 210, a first feedback circuit 230*a*, 230*b*, a second feedback circuit 240, or a circuit 250. The output node 212 may be operable to be coupled to the load 220. The pass device 210 may be operable to pass current to the output node 212 based on a voltage applied to the pass device 210. The pass device 210 may include a p-channel transistor and/or an n-channel transistor. The first feedback circuit 230*a*, 230*b* may be operable to adjust the voltage applied to the pass device 210 based on an output node 212 voltage. The second feedback circuit 240 may be operable to adjust the voltage applied to the pass device based on a change to the output node 212 voltage.

The voltage regulator circuit 200 may be arranged in accordance with at least some examples described herein. The elements in the voltage regulator circuit 200 may be coupled as illustrated in FIG. 2. The transistors with an arrow directed to the body are p-channel transistors (e.g., transistors 243, 208) and the leg with the arrow is the source (e.g., sources 243*a*, 208*a* for transistors 243, 208, respectively). The transistors with an arrow directed away from the body are n-channel transistors (e.g., transistors 245, 246, 247) and the leg with the arrow is the source (e.g., sources 245*a*, 247*a*, 246*a*).

The transistor 243 may include a source 243*a*, a gate 243*b*, and a drain 243*c*. The transistor 208 may include a source 208*a*, a gate 208*b*, and a drain 208*c*. The transistor 245 may include a source 245*a*, a gate 245*b*, and a drain 245*c*. The transistor 246 may include a source 246*a*, a gate 246*b*, and a drain 246*c*. The transistor 247 may include a source 247*a*, a gate 247*b*, and a drain 247*c*.

The pass device 210, the output node 212, the load 220, the first feedback circuit 230*a*, 230*b*, the second feedback circuit 240, and the circuit 250 may be example implementations of the pass device 110, the output node 112, the load 120, the first feedback circuit 130, the second feedback circuit 140, and the circuit 150 as described with respect to FIG. 1. Other implementations of the pass device 110, the output node 112, the load 120, the first feedback circuit 130, the second feedback circuit 140, and the circuit 150 that may perform as described in this disclosure are considered by this disclosure.

The pass device 210 may include the transistor 208 with a drain 208*c* coupled to the first feedback circuit 230*a*, 230*b* and the second feedback circuit 240. The voltage provided to the gate 208*b* may be the power dissipation (PD) gate voltage (e.g., VDDA_PD 242). The voltage provided to the gate 208*d* may be an amount of from about 1 V to about 200 V, or from about 100 my to about 5000 my, or from about 0.1 mV to about 100 mV. The pass device 210 may be coupled to the output node 212 that may have a voltage of ldo_vout. The voltage of ldo_vout may be an amount of from about 1 V to about 200 V, or from about 100 my to about 5000 mV, or from about 0.1 mV to about 100 mV. The load 220 may have a resistor 222 and a capacitor 224 as illustrated and may be coupled to the output node 212. The resistance of the load may be an amount of from about 1Ω to about 1000Ω, or from about 100 mΩ to about 5000 ma or from about 0.1 mΩ to about 100 mΩ. The capacitance of the load may be an amount of from about 0.1 to about 100 or from about 1 μF to about 20 or from about 1 μF to about 10 μF. By using a PMOS device as the pass device 210 the ldo_vout voltage may be closer to the rail voltages VDDA_AMP and VDDA_PD compared to when an NMOS device is used. The ldo_vout voltage may be set to be an amount less than or equal to the voltage across the pass device 210 (i.e., to VDDA_PD). Furthermore, given the configuration of the voltage regulator circuit 200, the rail voltages VDDA_AMP and VDDA_PD may be equal or approximately equal. In one example, one or more of the rail voltages may be an amount of from about 1 V to about 200 V, or from about 100 mV to about 5000 mV, or from about 0.1 mV to about 100 mV.

The first feedback circuit 230*a*, 230*b* may include one or more of a first resistor 238*a*, a second resistor 238*b*, or an amplifier 233. The output of the voltage divider circuit in 230*b* may be input to the amplifier 233 at positive terminal 234*a*. The current across the first resistor 238*a* and the second resistor 238*b* may be the current 234*i*. The current 234*i* may be an amount of from about 1 A to about 100 A, or from about 100 μA to about 5000 mA, or from about 1 μA to about 1000 mA. The second terminal 232 (e.g., negative terminal) of the amplifier 233 may be operable to receive the voltage, Vbg. The voltage, Vbg may be an amount of from about 1 V to about 200 V, or from about 100 my to about 5000 mV, or from about 0.1 mV to about 100 mV.

The first feedback circuit may be operable to generate voltage feedback 234*b* to be input to the amplifier 233 using the first resistor 238*a* and the second resistor 238*b* as a voltage divider. That is, the first feedback circuit 230*a*, 230*b* may include a first resistor 238*a* and a second resistor 238*b* and an amplifier 233. The first resistor 238*a* and the second resistor 238*b* may be configured in a voltage divider format and operable to generate a voltage feedback 234*b* based on the ido_vout voltage of the output node 212. The voltage feedback 234*b* may be provided to a first terminal of the amplifier 234*a*. A second terminal 232 (e.g., negative terminal) of the amplifier may be provided a constant voltage reference Vbg or equivalent, which may be a set voltage. The amplifier 233 may output a Vout-amp based on the voltage feedback 234*b* and the voltage Vbg. The amplifier 233 may be coupled to the second feedback circuit 240 and the circuit 250 by the connection 236.

The second feedback circuit 240 may include one or more of the transistors 245, 246, 247, or the resistor 244. The transistor 246 may be configured in a voltage follower configuration with the drain 246*c* and the gate 246*b* of the transistor 246 directly coupled to the output node 212. The configuration of the transistor 246 may reduce the impedance of the output node 212. Additionally, the transistor 246 and the transistor 247 may draw a current from the pass device 210 to maintain the pass device 210 in the saturation region.

The transistor 245 may include a gate 245*b* coupled to the first feedback circuit 230*a*, 230*b* and a drain 245*c* coupled to the pass device 210. In these and other examples, the output voltage at the connection 236 of the amplifier 233 of the first feedback circuit 230*a*, 230*b* may be provided to the gate 245*b* of the transistor 245. The transistor 245 may adjust the current passing through the transistor 245 and thereby adjust the PD-gate voltage provided to the pass device 210. As such, the second feedback circuit 240 may adjust the pass device 210 based on an output of the first feedback circuit 230*a*, 230*b*. The transistor 246 may act as a current source to draw a current i2−i1 246*i* that may be a combination of the current i1 through the transistor 243 and the current i2 247*i* through the transistor 247. The transistor 247 may be biased by a voltage, nbias. The voltage, nbias, may be an amount of from about 1 V to about 100 V, or from about 100 my to about 2500 mV, or from about 0.1 mV to about 50 mV.

The transistor 245 and the transistor 246 may have similar characteristics. For example, the transistor 245 and the transistor 246 may be equally sized such that the transistor 245 and the transistor 246 have similar lengths and widths. In these and other examples, the transistor 245 and the transistor 246 may be sized to have a conductance (e.g., gm) that may be adequate to decrease the impedance of the output node 212 to a value that provides for proper operation of the voltage regulator circuit 200. The conductance may be an amount of from about 1 mS to about 1000 mS, or from about 1 μS to about 100 mS, or from about 1 mS to about 50 mS.

The transistor 243 may act as a current source based on a bias voltage at the gate 243*b* to draw a current i1 243*i*. The current i1 243*i* may be a current that passes through transistor 245 to bias transistor 245. The resistor 244 may be operable to provide a relatively small biasing current for transistor 245. For example, in some circumstances, such as when a load is not coupled to the output node 212, the transistor 245 may not pass a current. The resistor 244 may provide a current 244*i* during this scenario to allow transistor 245 to be biased and allow operation of the second feedback circuit 240 when a load is not coupled to the output node 212. The current 246*i* directed into the transistor 246 may be approximately equal to the difference between the current i2 247*i* through the transistor 247 and the current i1 243*i* directed into the transistor 243.

The circuit 250 may include one or more of a capacitor 252 or a resistor 254. The circuit may be operable to increase a phase margin of the voltage regulator based on one or more of a dominant pole for the voltage regulator or a zero for the voltage regulator. That is, the circuit 250 may be operable to provide a pole and zero for the voltage regulator circuit 200. The circuit 250 may be operable to include a capacitor C1 252 and a resistor 254. The value of the capacitor C1 252 may be selected to generate a dominant pole within the voltage regulator circuit 200 based on the location of other poles in the voltage regulator circuit 200 and the maximum capacitance of a load that the voltage regulator circuit 200 may support. The capacitance for capacitor C1 252 may be an amount of from about 1Ω to about 1000Ω, or from about 100 mΩ to about 5000 ma or from about 0.1 mΩ to about 100 mΩ. The resistor 254 may be selected to place a zero close to a unity gain frequency of the pole created by the capacitance for the capacitor C1 252. As a result, the phase margin of the voltage regulator circuit 200 may be increased by using the resistor 254. The resistor 254 may have a resistance that may be an amount of from about 1Ω to about 1000Ω, or from about 100 mΩ to about 5000 ma or from about 0.1 mΩ to about 100 mΩ.

By positioning the second feedback circuit 240 between the circuit 250 and the output node 212, the second feedback circuit 240 may buffer the circuit 250 such that changes in the capacitance of the load 220 may have a reduced effect on the circuit 250. Furthermore, in these and other examples, including the circuit 250 may allow for the resistance of the first resistor 238*a* and/or the second resistor 238*b* to be increased as the zero's generated by the first resistor 238*a* and/or the second resistor 238*b* may not be dominant zeros based on including the circuit 250 in the voltage regulator circuit 200.

Modifications, additions, or omissions may be made to the voltage regulator circuit 200 without departing from the scope of the present disclosure. For example, the voltage regulator circuit 200 may not include the circuit 250. Alternately or additionally, the circuit 250 may not include the resistor 254 and/or the capacitor 252.

In another example, a voltage regulator circuit 200 may include an output node 212 operable to be coupled to a load 220. A pass device 210 may be operable to pass current to the output node 212 based on a voltage applied to the pass device 210. The pass device may be a p-channel transistor. The first feedback circuit 230*a*, 230*b* may be operable to adjust the voltage applied to the pass device 210 based on an output node 212 voltage. A second feedback circuit 240 may be configured reduce an impedance of the output node 212. A circuit 250 may be operable to increase a phase margin of the voltage regulator circuit 200.

The first feedback circuit may include a first resistor 238*a*, a second resistor 238*b*, and an amplifier 233. The circuit 250 may include one or more of a capacitor 252 or a resistor 254.

Figure 3:
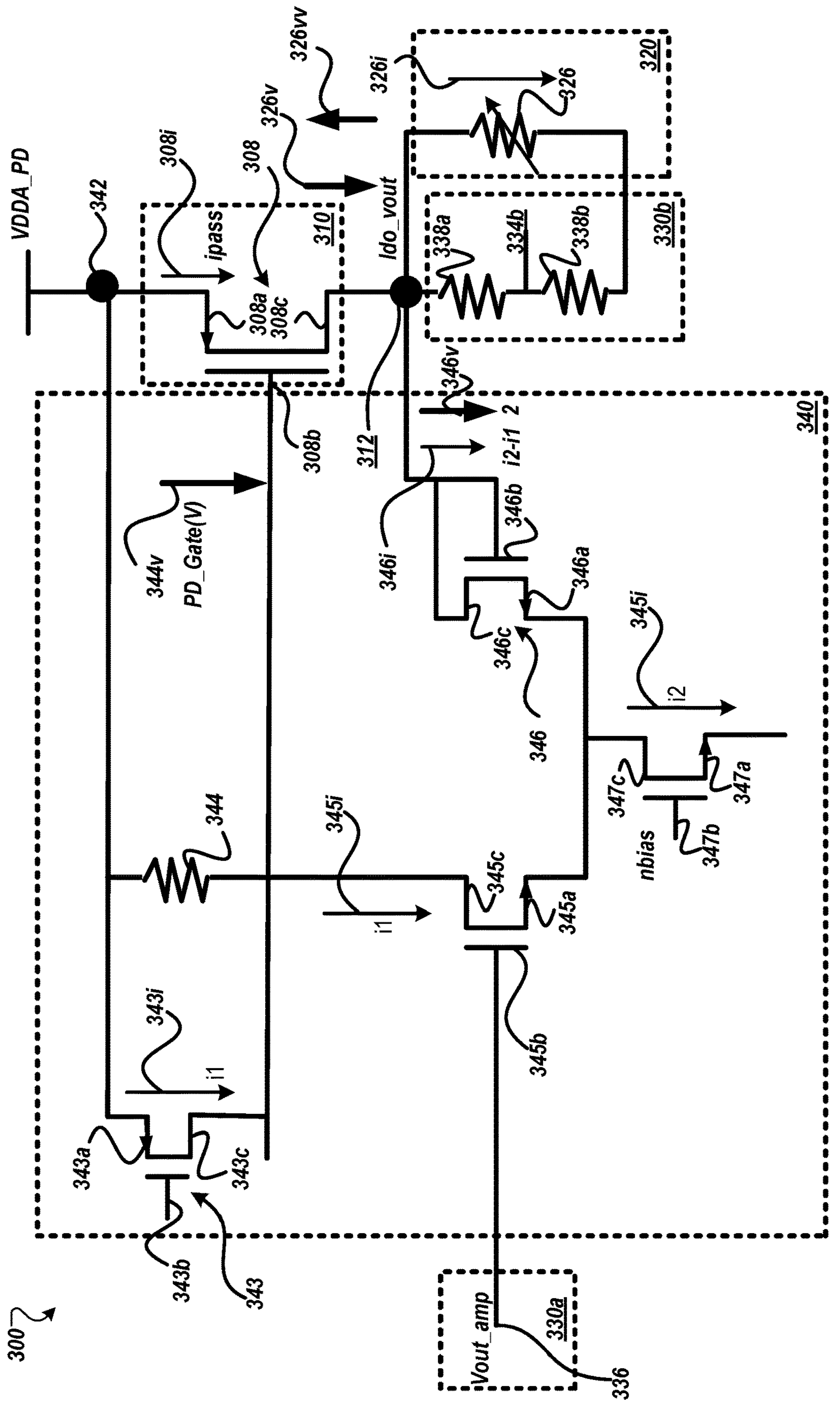
FIG. 3 illustrates voltage and current changes in an example voltage regulator circuit.

As illustrated in FIG. 3, a voltage regulator circuit 300 may include one or more of an output node 312, a pass device 310, a first feedback circuit 330*a*, 330*b*, or a second feedback circuit 340. The output node 312 may be operable to be coupled to a load (which may include a variable resistor 326). The pass device 310 may be operable to pass current to the output node 312 based on a voltage 342 applied to the pass device 310. The pass device may include a transistor 308 (e.g., a p-channel transistor). The transistor 308 may include a source 308*a*, a gate 308*b*, and a drain 308*c*. The first feedback circuit 330*a*, 330*b* may be operable to adjust the voltage 342 applied to the pass device 310 based on an output node 312 voltage. The second feedback circuit 340 may be operable to adjust the voltage 342 applied to the pass device based on a change to the output node 312 voltage.

Voltage and current changes may be arranged in accordance with at least some examples described herein. The voltage regulator circuit 300 may be similar to the voltage regulator circuit 200 of FIG. 2. Voltage regulator circuit 300 may be configured using the voltages, resistances, capacitances, conductance, current, or the like as described with reference to FIG. 2.

The second feedback circuit 340 may include an alternating current (AC) feedback loop operable to facilitate dynamic current to increase a transient response of the voltage regulator circuit 300. For example, the second feedback circuit 340 may be an AC feedback loop facilitating movement of dynamic current to improve a transient response of the voltage regulator circuit 300. For example, the voltage regulator circuit 300 may not have a load current 326*i* being drawn, e.g., the load current may be near zero (e.g., less than one or more of 10 mA, 1 mA, 0.1 mA, 0.01 mA, 1 μA, or the like). In this circumstance, the load current 326*i* may increase rapidly when a load current 326*i* starts to be drawn by a load 320. When the load current 326*i* increases, the load voltage 326*v* may decrease which may reduce Vgs 346*v*. The decrease in Vgs 346*v* may reduce the current 346*i*, which may facilitate transistor 345 sourcing additional current to maintain current i2 345*i*. When transistor 345 sources additional current, i1 345*i*, 343*i* may increase, which may result in the PD_gate voltage 344*v* decreasing. Decreasing the PD_gate voltage 344*v* may increase the Vgs of transistor 308, which may increase the current 308*i* and increase subsequent ldo_vout 326*vv* higher to compensate for the previous ldo_vout 326*v* falling. Thus, the second feedback circuit 340 may operate independently of a first feedback circuit 330*a*, 330*b* to stabilize the voltage of ldo_vout. The second feedback circuit 340 may operate in a similar manner when the i_load decreases rapidly to stabilize ldo_vout.

The second feedback circuit 340 may include a transistor 343 that may include a source 343*a*, a gate 343*b*, and a drain 343*c*. A current i1 343*i* may flow across the transistor 343. The transistor 343 may be in parallel with the resistor 344. The resistor 344 may facilitate a voltage PD-Gate(V) 344*v*. The PD-Gate (V) 344*v* may be an amount of from about 1 V to about 200 V, or from about 100 my to about 5000 my, or from about 0.1 mV to about 100 mV.

The second feedback circuit 340 may include a transistor 345 which may include a source 345*a*, a gate 345*b*, and a drain 345*c*. The transistor 345 may be operable to receive a current i1 345*i* which may be the same current as the current i1 343*i* at a different location in the voltage regulator circuit 300. The second feedback circuit 340 may include a transistor 346 (which may be an n-channel transistor) that may include a source 345*a*, a gate 345*b*, and a drain 345*c*. The transistor 346 may be coupled to a transistor 346 (which may be an n-channel transistor) that may include a source 346*a*, a gate 346*b*, and a drain 346*c*. The transistors 345 and 346 may be coupled to a transistor 347 (which may be an n-channel transistor) that may include a source 347*a*, a gate 347*b*, and a drain 347*c*.

In another example, a voltage regulator circuit 300 may include one or more of an output node 312, a pass device 310, a first feedback circuit 330*a*, 330*b*, or a second feedback circuit 340. The output node 312 may be operable to be coupled to a load 320. The pass device 310 may be operable to pass current to the output node 312 based on a voltage 342 applied to the pass device 310. The pass device 310 may be a p-channel transistor. The first feedback circuit 330*a*, 330*b* may be operable to adjust the voltage 342 applied to the pass device 310 based on an output node 312 voltage. The second feedback circuit 340 may be configured reduce an impedance of the output node 312. The voltage regulator circuit may further include a circuit (e.g., a circuit 150 in FIG. 1, a circuit 250 in FIG. 2, or a circuit 450 in FIG. 4), that may be operable to increase a phase margin of the voltage regulator circuit 300. In some examples, the second feedback circuit 340 may include an alternating current (AC) feedback loop.

The first feedback circuit 330*a*, 330*b* may include one or more of a first resistor 338*a*, a second resistor 338*b*, or a voltage feedback 334*b* which may be provided to a first terminal of the amplifier (not shown) which may be operable to output a voltage using the connection 336.

Modifications, additions, or omissions may be made to the voltage regulator circuit 300 without departing from the scope of the present disclosure.

Figure 4:
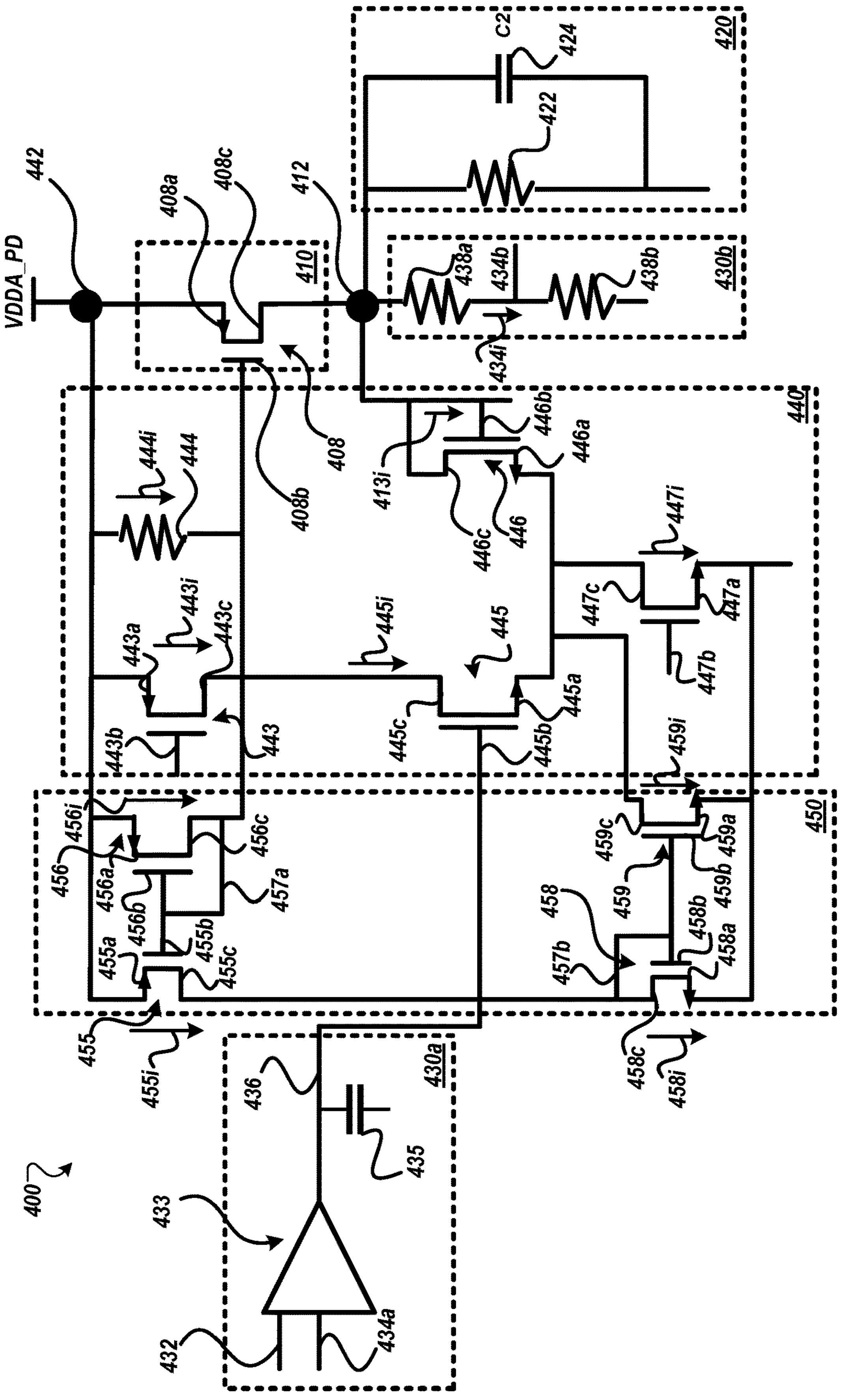
FIG. 4 illustrates another example voltage regulator circuit.

As illustrated in FIG. 4, a voltage regulator may include one or more of an output node 412, a pass device 410, a first feedback circuit 430*a*, 430*b*, a second feedback circuit 440, or a circuit. The output node 412 may be operable to be coupled to a load 420. The pass device 410 may be operable to pass current to the output node 412 based on a voltage 442 applied to the pass device 410. The pass device may be a p-channel transistor. The first feedback circuit 430*a*, 430*b* may be operable to adjust the voltage 442 applied to the pass device based on an output node 412 voltage. The voltage 442 applied to the pass device 410 may be an amount of from about 1 V to about 200 V, or from about 100 my to about 5000 my, or from about 0.1 mV to about 100 mV. The second feedback circuit 440 may be operable to adjust the voltage 442 applied to the pass device 410 based on a change to the output node 412 voltage. The change to the output node 412 voltage may be any suitable amount less than or equal to the voltage to the pass device 410. The change to the output node 412 voltage may be an amount of from about 1 V to about 200 V, or from about 100 my to about 5000 my, or from about 0.1 mV to about 100 mV, or from 1 μV to about 1000 μV.

The pass device 410 may be in a configuration as disclosed with respect to FIGS. 2 and 3. The pass device 410 may include a transistor 408 (e.g., a p-channel transistor) including one or more of a source 408*a*, a gate 408*b*, or a drain 408*c*.

The load 420 may be in a configuration as disclosed with respect to FIG. 2. The load 420 may include one or more of a resistor 422 or a capacitor 424.

The first feedback circuit 430*a*, 430*b* may be in a configuration as disclosed with respect to FIGS. 2-4. A voltage divider may include a resistor 438*a* and 438*b* which may be operable to output voltage feedback 434*b* that may be directed to a positive terminal 434*a* of an amplifier 433. The amplifier may receive a voltage at the negative terminal 432. The voltage may be an amount of from about 1 V to about 200 V, or from about 100 my to about 5000 my, or from about 0.1 mV to about 100 mV. The amplifier may be coupled to a connection 436 to the circuit 450 or to a capacitor 435.

The second feedback circuit 440 may be in a configuration as disclosed with respect to FIGS. 2 and 3. The second feedback circuit 440 may include one or more of: one or more transistors 443, 445, 446, 447. Transistor 443 may be a p-channel transistor including a source 443*a*, a gate 443*b*, and a drain 443*c*. Transistor 445 may be an n-channel transistor including a source 445*a*, a gate 445*b*, and a drain 445*c*. Transistor 446 may be an n-channel transistor including a source 446*a*, a gate 446*b*, and a drain 446*c*. Transistor 447 may be an n-channel transistor including a source 447*a*, a gate 447*b*, and a drain 447*c*. The second feedback circuit may include a resistor 444.

The circuit 450 may include one or more transistors 455, 456, 457, 459 in a mirror configuration (e.g., transistors 455 and 456 may be in a mirror configuration and transistors 457 and 459 may be in a mirror configuration) to facilitate one or more of: an increased transient response for the voltage regulator circuit 400, or an increased power supply rejection ratio (PSRR) for the voltage regulator circuit 400 to match the PSRR when an n-channel transistor is used at the pass device 410.

Transistor 455 may be a p-channel transistor having a source 455*a*, a gate 455*b*, and a drain 455*c*. Transistor 455 may be a mirror of transistor 456. Transistor 456 may be a p-channel transistor having a source 456*a*, a gate 456*b*, and a drain 456*c*. The drain 456*c* may be coupled to the gate 456*b* and the gate 455*b* using the connection 457*a*.

Transistor 458 may be an n-channel transistor having a source 458*a*, a gate 458*b*, and a drain 458*c*. Transistor 458 may include a connection 457*b* between the source 458*a* and the gate 458*b*. Transistor 458 may be a mirror of transistor 459. Transistor 459 may be an n-channel transistor having a source 459*a*, a gate 459*b*, and a drain 459*c*.

The voltage regulator circuit 400 may be similar to the voltage regulator circuit 200 except the circuit 450 of the voltage regulator circuit 400 may be different compared to the circuit 250 of voltage regulator circuit 200. In these and other examples, the circuit 450 may include four transistors (e.g., 455, 456, 457, 459). The one or more transistors 455, 456 (e.g., p-channel metal-oxide-semiconductor (PMOS) transistors) may be coupled to the VDDA_PD and two n-channel transistors 457, 459 (e.g., NMOS transistors) may be coupled to ground. The circuit 450 may adjust configurations of the voltage regulator circuit 400 to increase the PSRR bandwidth and the transient response of the voltage regulator circuit 400. For example, the PSRR bandwidth may increase based on the circuit 450 facilitating a reduction in the impedance between the second feedback circuit 440 and the gate 408*b* of the pass device 410. As another example, the transient response may increase based on more current being sourced by the second feedback circuit 440 from the pass device 410 based on the circuit 450.

In another example, the voltage regulator circuit 400 may include one or more of an output node 412, a pass device 410, a first feedback circuit 430*a*, 430*b*, a second feedback circuit 440, or a circuit. The output node 412 may be operable to be coupled to a load 420. The pass device 410 may be operable to pass current to the output node 412 based on a voltage 442 applied to the pass device 410, wherein the pass device 410 includes a pass device p-channel transistor. The first feedback circuit 430*a*, 430*b* may be operable to adjust a voltage 442 output to the pass device based on an output node 412 voltage. A second feedback circuit 440 may include a second feedback circuit first n-channel transistor (e.g., transistor 445) and a second feedback circuit second n-channel transistor (e.g., transistor 446). A circuit 450 may include one or more circuit transistors (e.g., transistors 455, 456, 457, 459) in a mirror configuration to increase one or more of a power supply rejection ratio (PSRR) bandwidth or a transient response of the voltage regulator. In some examples, using the circuit 450 as compared to the circuit 250 may improve the transient response and the PSRR bandwidth. In these and other examples, the improvement may be more than an order of magnitude. In one example, the power supply rejection ratio, for a bandwidth of from 10 Hz to about 10 megahertz (MHz) may be an amount of from −100 dB to about −3 dB, or from about −80 dB to about −10 dB, or from about −50 dB to about −10 dB. In one example, the transient response of the voltage regulator may be an amount of from 1 µs to about 100 µs, of from 100 ns to about 10 µs, or of from 0.1 ns to about 100 ns.

The circuit 450 may be a dynamic system operable to mirror a portion of the load 420 current to thereby increase a current in the second feedback circuit 440. The portion of the load 420 current may be a ratio of the load 420 current. As such, a current in the second feedback circuit 440 may change proportional to the changes in the load 420 current.

The transistor 456 may be in a mirror configuration with the transistor 455 and may be designed to source a portion of the current sourced by the transistor 408. The mirror configuration may be based on the configuration of the transistors 455, 456, 457, 459 in the circuit 450 as illustrated in FIG. 4.

The one or more circuit transistors (e.g., transistors 455, 456, 457, 459) may include one or more circuit p-channel transistors (e.g., transistors 455, 456) and one or more circuit n-channel transistors (e.g., transistors 458, 459). The one or more circuit transistors (e.g., transistors 455, 456, 457, 459) may include a circuit first p-channel transistor (e.g., transistor 456) and a circuit first mirrored p-channel transistor (e.g., transistor 455) that may be operable to input current (or source current) to one or more of the pass device p-channel transistor (e.g., transistor 408 of pass device 410) or the second feedback circuit first n-channel transistor (e.g., transistor 445 of the second feedback circuit 440). The one or more circuit transistors (e.g., transistors 455, 456, 457, 459) may include a circuit first n-channel transistor (e.g., transistor 459) and a circuit first mirrored n-channel transistor (e.g., transistor 458) that may be operable to receive current from the second feedback circuit first n-channel transistor (e.g., transistor 445 of the second feedback circuit 440).

This double mirrored configuration for the one or more transistors (e.g., transistors 455, 456, 457, 459) may be used to direct input currents or receive output currents from other components of the voltage regulator circuit 400. The one or more transistors (e.g., transistors 455, 456, 457, 459) may include a circuit first p-channel transistor (e.g., transistor 456) operable to direct an input current to the second feedback circuit second n-channel transistor (e.g., transistor 446). The one or more transistors (e.g., transistors 455, 456, 457, 459) may include a circuit first n-channel transistor (e.g., transistor 459) operable to direct an output current from the second feedback circuit second n-channel transistor (e.g., transistor 446), The output current (e.g., from the transistor 446 to the transistor 459) to the input current (e.g., to the transistor 446 from the transistor 456) may have a ratio greater than one or more of: 1.0, 1.2, 1.5, 1.8, 2.0, or the like. The ratio of the output current to the input current ratio may be selected to direct current to the second feedback circuit second n-channel transistor (e.g., transistor 446) from the pass device p-channel transistor (e.g., transistor 408). The output current may be an amount of from about 1 A to about 100 A, or from about 100 µA to about 5000 mA, or from about 1 µA to about 1000 mA. The input current may be an amount of from about 0.5 A to about 50 A, or from about 50 µA to about 2500 mA, or from about 0.5 µA to about 500 mA.

For example, the transistor 456 may source 1/100 or less of the current sourced by transistor 408. The transistor 456 may source less current based on the configuration of the transistor 456. In some examples, transistor 456 may source current when the transistor 408 sources current and may not source current when the transistor 408 does not source current. The transistor 455 may be in a mirror relationship with the transistor 456.

In some examples, the current sourced by the transistor 456 may pass through the 445. The amount of current sourced may be an i-track-p current. The i-track-p current may be a ratio of the current sourced by the transistor 408. The transistor 459 may be operable to sink at least twice as much current when compared to the current sourced by the transistor 456. The transistor 459 may be mirrored by the transistor 457. The transistor 459 may sink more current than the transistor 456 sources based on the configuration of the transistor 459 and the transistor 456. Because the transistor 459 may sink more current than may be sourced by the transistor 456, this difference in sinking and sourcing may cause the transistor 446 to source more current from the transistor 408. For example, the difference in sinking and sourcing may cause transistor 446 to source more current equal to a difference between the current sourced by the transistor 456 and the current sunk by transistor 459.

The currents sourced by transistor 456 and sunk by the transistor 459 may be dynamic currents, such as AC transient currents. Thus, the currents sourced and sunk by the transistors 456, 459 may assist in transient changes to the load currents. The first feedback circuit 430*a*, 430*b* and the second feedback circuit 440 may assist in facilitating static direct current (DC) currents that may maintain the voltage at output node 412. The voltage at output node 412 may be an amount of from about 1 V to about 200 V, or from about 100 my to about 5000 my, or from about 0.1 mV to about 100 mV.

The voltage regulator circuit may have dynamic current and static currents. The dynamic currents may include the currents 413*i*, 445*i*, 455*i*, 456*i*, 458*i*, 459*i* and the static DC currents may include the currents 443*i*, 456*i*, 447*i* and 434*i*. Current 413*i* and 445*i* may be dynamic currents sourcing the transistors 445 and 446, respectively. Current 445*i* may be a dynamic current sourcing the transistor 445. Currents 455*i*, 456*i*, 458*i*, and 459*i* may be dynamic currents across the transistors 455, 456, 457, 459, respectively. The static currents may include the currents 434*i*, 443*i*, 444*i*, 447*i*. The currents 443*i* and 447*i* may be static DC currents across the transistors 443 and 447, respectively. The current 434*i* may be a static DC current between the resistors 438*a* and 438*b*. The current 444*i* may be a static DC current across the resistor 444.

Modifications, additions, or omissions may be made to the voltage regulator circuit 400 without departing from the scope of the present disclosure. Voltage regulator circuit 400 may be configured using the voltages, resistances, capacitances, conductance, current, or the like as described with reference to FIG. 2 and/or FIG. 3.

In another example, a voltage regulator circuit 400 may include a voltage regulator may include one or more of an output node 412, a pass device 410, a first feedback circuit 430*a*, 430*b*, a second feedback circuit 440, or a circuit. The output node 412 may be operable to be coupled to a load 420. The pass device 410 may be operable to pass current to the output node 412 based on a voltage 442 applied to the pass device 410. The pass device 410 may include a p-channel transistor. The first feedback circuit 430*a*, 430*b* may be operable to adjust a voltage 442 output to the pass device based on an output node 412 voltage. A second feedback circuit 440 may be configured to reduce an impedance of the output node 412. The circuit 450 may be operable to increase a phase margin of the voltage regulator circuit 400. The first feedback circuit may include one or more of a first resistor, second resistor, or an amplifier. The circuit may include one or more transistors (e.g., transistors 455 and 456, or transistors 457 and 459) in a mirror configuration.

In FIGS. 2, 3, and 4, the illustrated transistors are illustrated as metal-oxide-semiconductor field-effect transistor (MOSFET) transistors and bipolar junction transistors (BJT) transistors. The above description uses the nomenclature gate, source, and drain to represent different terminals of the transistors. The use of the names gate, source, and drain may be used to describe generically the terminals of the MOSFET transistor, the BJT transistors, or other types of transistors, such as junction gate field-effect transistors (JFET) and insulated gate bipolar transistors. Furthermore, p-channel transistors or some combination of n-channel and p-channel transistors may also be used in place of the transistors illustrated in FIGS. 2, 3, and 4.

Figure 5:
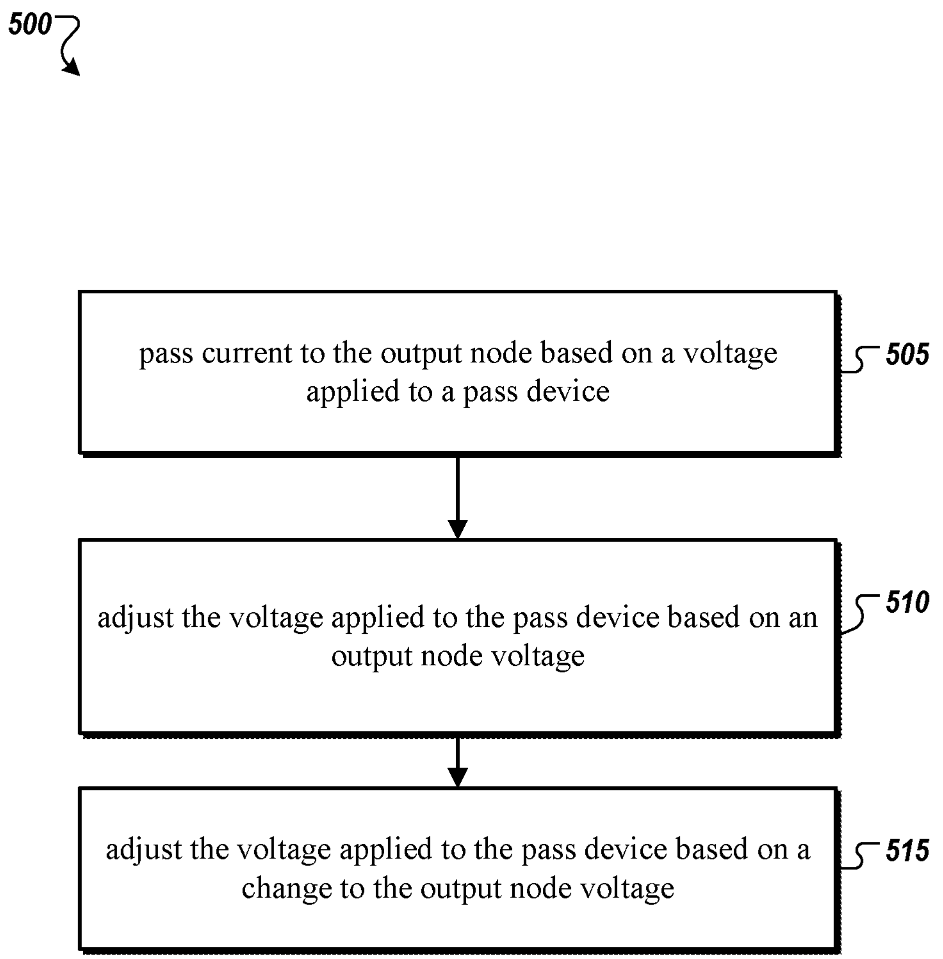
FIG. 5 illustrates an example process flow of a voltage regulator described according to at least one implementation of the present disclosure.

FIG. 5 illustrates a process flow of an example method 500 for a voltage regulator circuit, in accordance with at least one example described in the present disclosure. The method 500 may be arranged in accordance with at least one example described in the present disclosure.

Figure 8:
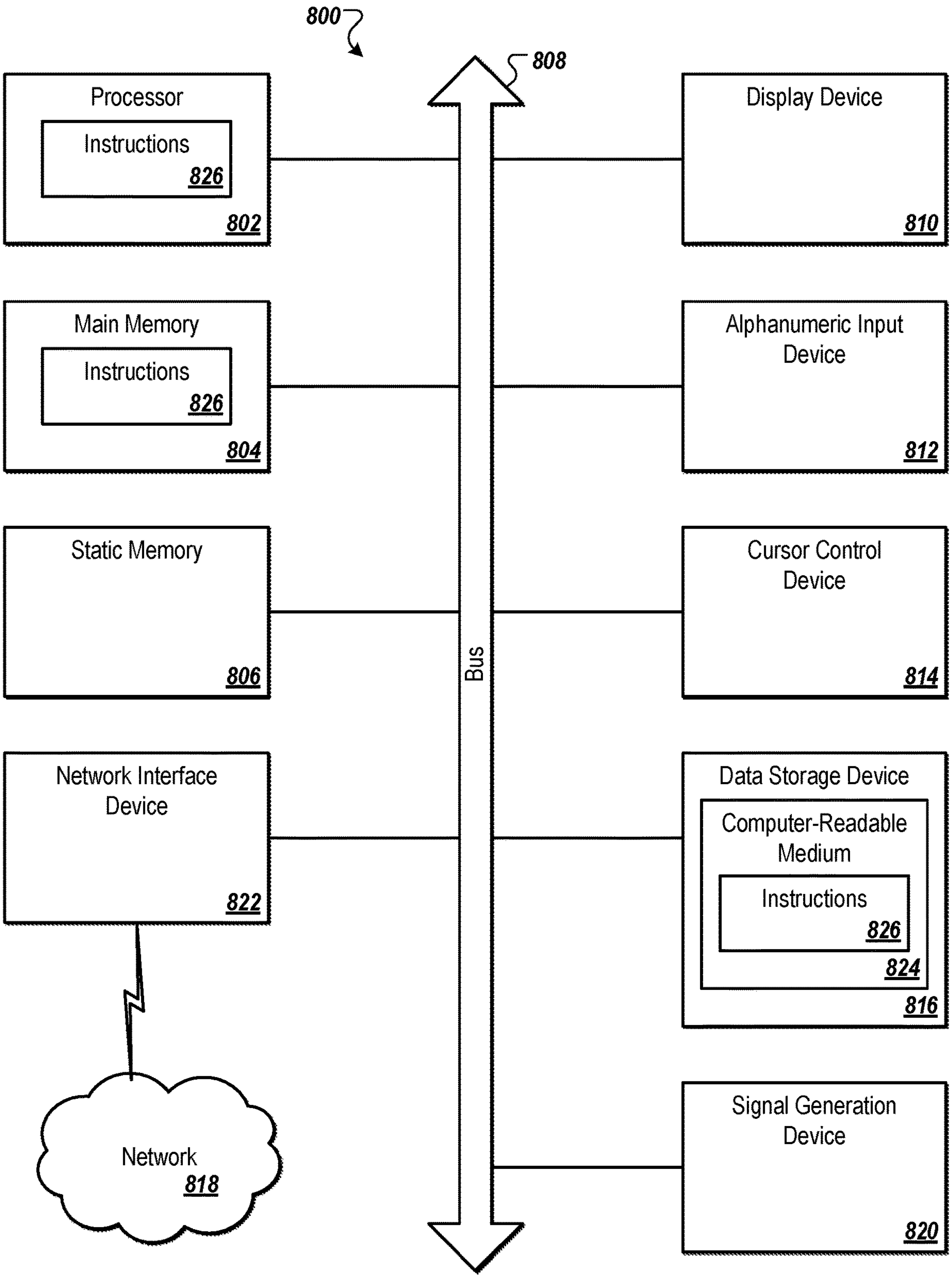
FIG. 8 illustrates a diagrammatic representation of a machine in the example form of a computing device within which a set of instructions, for causing the machine to perform any one or more of the methods discussed herein, may be executed.

The method 500 may be performed by processing logic that may include hardware (circuitry, dedicated logic, etc.), software (such as is run on a computer system or a dedicated machine), or a combination of both, which processing logic may be included in the processing device (e.g., processor 802) of FIG. 8, or another device, combination of devices, or systems.

The method 500 may begin at block 505 wherein the processing logic may pass current to the output node based on a voltage applied to a pass device.

At block 510, the processing logic may adjust the voltage applied to the pass device based on an output node voltage.

At block 515, the processing logic may adjust the voltage applied to the pass device based on a change to the output node voltage.

Modifications, additions, or omissions may be made to the method 500 without departing from the scope of the present disclosure. For example, in some examples, the method 500 may include any number of other components that may not be explicitly illustrated or described.

Figure 6:
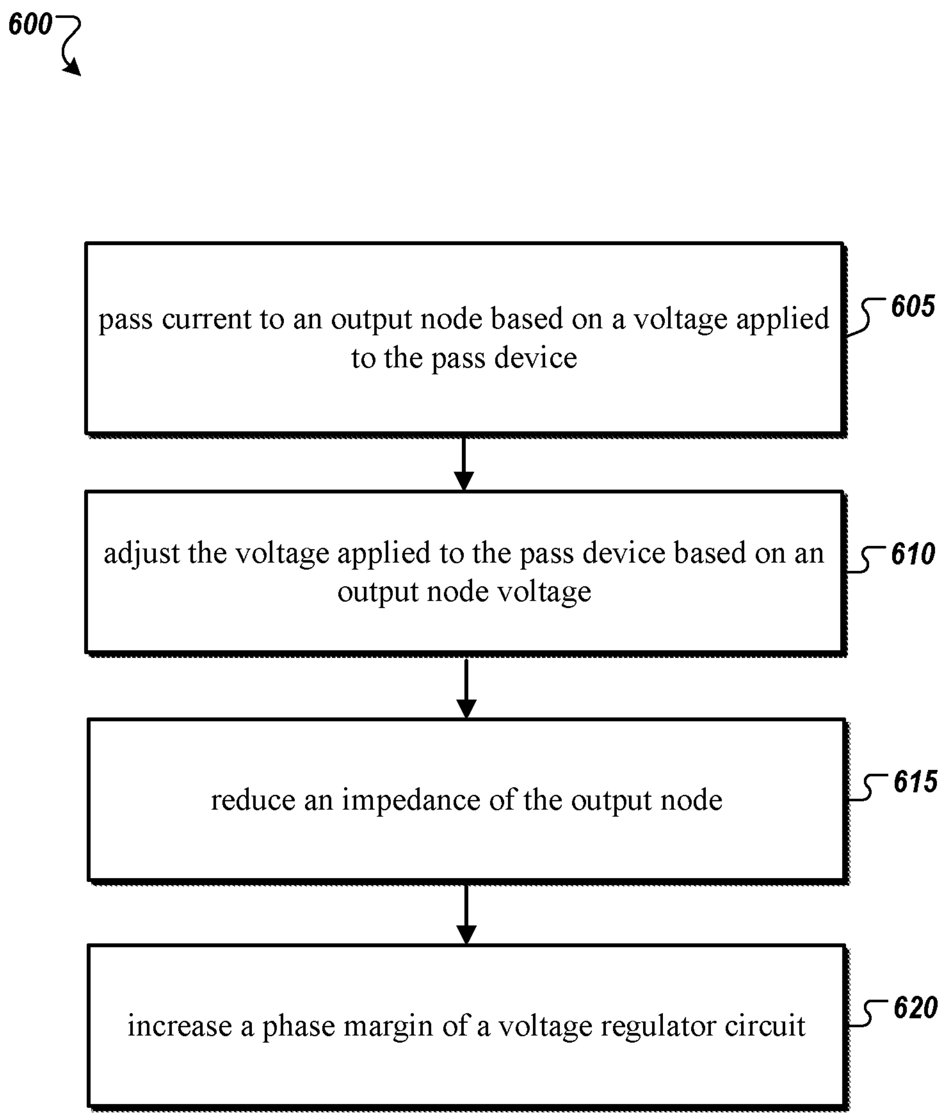
FIG. 6 illustrates an example process flow of a voltage regulator described according to at least one implementation of the present disclosure.

FIG. 6 illustrates a process flow of an example method 600 that may be used for a voltage regulator circuit, in accordance with at least one example described in the present disclosure. The method 600 may be arranged in accordance with at least one example described in the present disclosure.

The method 600 may be performed by processing logic that may include hardware (circuitry, dedicated logic, etc.), software (such as is run on a computer system or a dedicated machine), or a combination of both, which processing logic may be included in the processing device (e.g., processor 802) of FIG. 8, or another device, combination of devices, or systems.

At block 605, the processing logic may pass current to an output node based on a voltage applied to the pass device.

At block 610, the processing logic may adjust the voltage applied to the pass device based on an output node voltage.

At block 615, the processing logic may reduce an impedance of the output node At block 620, the processing logic may increase a phase margin of a voltage regulator circuit.

Modifications, additions, or omissions may be made to the method 600 without departing from the scope of the present disclosure. For example, in some examples, the method 600 may include any number of other components that may not be explicitly illustrated or described.

Figure 7:
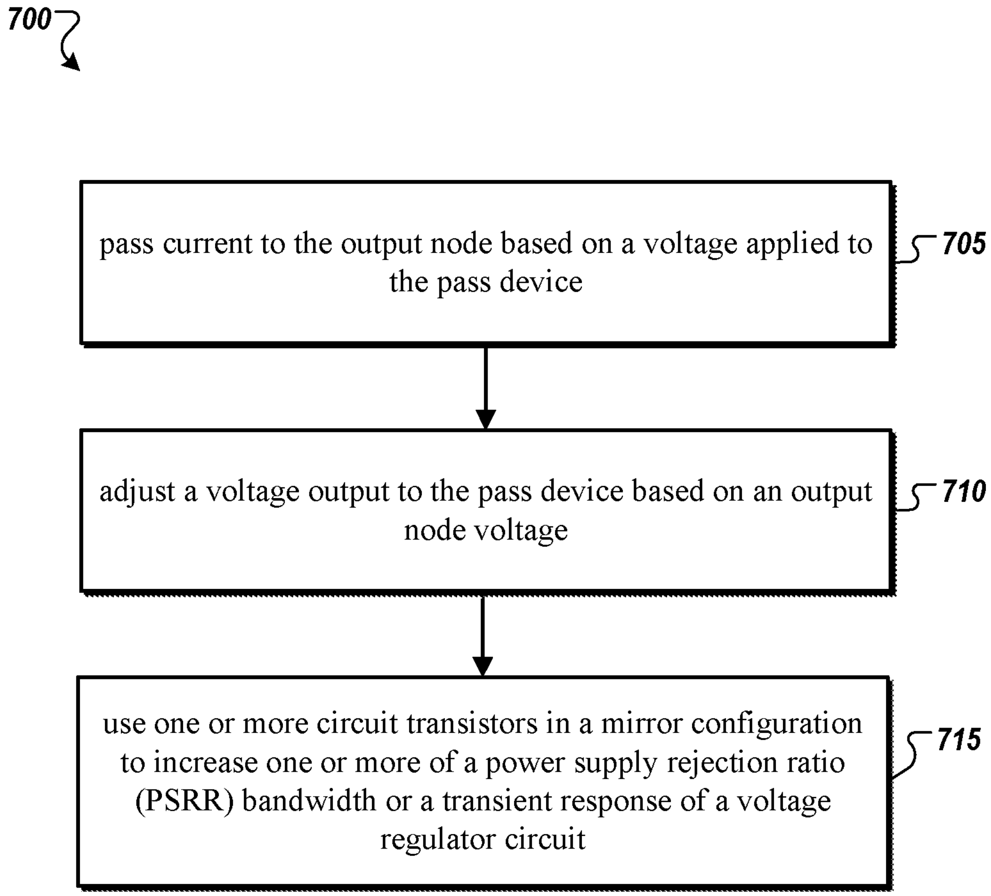
FIG. 7 illustrates an example process flow of a voltage regulator described according to at least one implementation of the present disclosure.

FIG. 7 illustrates a process flow of an example method 700 that may be used for a voltage regulator circuit, in accordance with at least one example described in the present disclosure. The method 700 may be arranged in accordance with at least one example described in the present disclosure.

The method 700 may be performed by processing logic that may include hardware (circuitry, dedicated logic, etc.), software (such as is run on a computer system or a dedicated machine), or a combination of both, which processing logic may be included in the processing device (e.g., processor 802) of FIG. 8, or another device, combination of devices, or systems.

The method 700 may begin at block 705 wherein the processing logic may pass current to the output node based on a voltage applied to the pass device.

At block 710, the processing logic may adjust a voltage output to the pass device based on an output node voltage.

At block 715, the processing logic may use one or more circuit transistors in a mirror configuration to increase one or more of a power supply rejection ratio (PSRR) bandwidth or a transient response of a voltage regulator circuit.

Modifications, additions, or omissions may be made to the method 700 without departing from the scope of the present disclosure. For example, in some examples, the method 700 may include any number of other components that may not be explicitly illustrated or described.

For simplicity of explanation, methods and/or process flows described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

Some portions of the detailed description are presented in terms of algorithms and symbolic representations of operations within a computer. An algorithm may be a series of configured operations leading to a desired end state or result. In example implementations, the operations carried out may use physical manipulations of tangible quantities for achieving a tangible result.

Description using terms such as detecting, determining, analyzing, identifying, scanning or the like, may include the actions and processes of a computer system or other information processing device that may manipulate and/or transform data represented as physical (electronic) quantities within the computer system's registers and memories into other data similarly represented as physical quantities within the computer system's memories or registers or other information storage, transmission, or display devices.

Example implementations may also relate to an apparatus for performing the operations herein. This apparatus may be specially constructed for the operations provided herein, or it may include one or more general-purpose computers selectively activated or reconfigured by one or more computer programs. Such computer programs may be stored in a computer readable medium, such as a computer-readable storage medium or a computer-readable signal medium. Computer-executable instructions may include, for example, instructions and data which cause a general-purpose computer, special-purpose computer, or special-purpose processing device (e.g., one or more processors) to perform or control performance of a certain function or group of functions.

FIG. 8 illustrates a diagrammatic representation of a machine in the example form of a computing device 800 within which a set of instructions, for causing the machine to perform any one or more of the methods discussed herein, may be executed. The computing system may be operable to implement or direct one or more operations associated with latency-based contention. The computing device 800 may include a rackmount server, a router computer, a server computer, a mainframe computer, a laptop computer, a tablet computer, a desktop computer, or any computing device with at least one processor, etc., within which a set of instructions, for causing the machine to perform any one or more of the methods discussed herein, may be executed. In alternative examples, the machine may be connected (e.g., networked) to other machines in a local area network (LAN), an intranet, an extranet, or the Internet. The machine may operate in the capacity of a server machine in client-server network environment. Further, while only a single machine is illustrated, the term "machine" may also include any collection of machines that individually or jointly execute a set (or multiple sets) of instructions to perform any one or more of the methods discussed herein.

The example computing device 800 includes a processing device (e.g., a processor 802), a main memory 804 (e.g., read-only memory (ROM), flash memory, dynamic random access memory (DRAM) such as synchronous DRAM (SDRAM)), a static memory 806 (e.g., flash memory, static random access memory (SRAM)) and a data storage device 816, which communicate via a bus 808.

Processing device (e.g., processor 802) represents one or more general-purpose processing devices such as a microprocessor, central processing unit, or the like. More particularly, the processing device (e.g., processor 802) may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device (processor 802) may also include one or more special-purpose processing devices such as an application specific integrated circuit (ASIC), a field programmable gate array (FPGA), a digital signal processor (DSP), network processor, or the like. The processing device (e.g., processor 802) is operable to execute instructions 826 for performing the operations and steps discussed herein.

The computing device 800 may further include a network interface device 822 which may communicate with a network 818. The computing device 800 also may include a display device 810 (e.g., a liquid crystal display (LCD) or a cathode ray tube (CRT)), an alphanumeric input device 812 (e.g., a keyboard), a cursor control device 814 (e.g., a mouse) and a signal generation device 820 (e.g., a speaker). In at least one example, the display device 810, the alphanumeric input device 812, and the cursor control device 814 may be combined into a single component or device (e.g., an LCD touch screen).

The data storage device 816 may include a computer-readable storage medium 824 on which is stored one or more sets of instructions 826 embodying any one or more of the methods or functions described herein. The instructions 826 may also reside, completely or at least partially, within the main memory 804 and/or within the processing device (e.g., processor 802) during execution thereof by the computing device 800, the main memory 804 and the processing device (e.g., processor 802) also constituting computer-readable media. The instructions may further be transmitted or received over a network 818 via the network interface device 822.

While the computer-readable storage medium 824 is shown in an example to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

In some examples, the different components, modules, engines, and services described herein may be implemented as objects or processes that execute on a computing system (e.g., as separate threads). While some of the systems and methods described herein are generally described as being implemented in software (stored on and/or executed by hardware), specific hardware implementations or a combination of software and specific hardware implementations are also possible and contemplated.

Unless specific arrangements described herein are mutually exclusive with one another, the various implementations described herein can be combined in whole or in part to enhance system functionality and/or to produce complementary functions. Likewise, aspects of the implementations may be implemented in standalone arrangements. Thus, the above description has been given by way of example only and modification in detail may be made within the scope of the present invention.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles “a” or “an” limits any particular claim containing such introduced claim recitation to examples containing only one such recitation, even when the same claim includes the introductory phrases “one or more” or “at least one” and indefinite articles such as “a” or “an” (e.g., “a” and/or “an” should be interpreted to mean “at least one” or “one or more”); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of “two recitations,” without other modifiers, means at least two recitations, or two or more recitations). Furthermore, in those instances where a convention analogous to “at least one of A, B, and C, etc.” or “one or more of A, B, and C, etc.” is used, in general such a construction is intended to include A alone, B alone, C alone, A and B together, A and C together, B and C together, or A, B, and C together, etc. For example, the use of the term “and/or” is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase “A or B” should be understood to include the possibilities of “A” or “B” or “A and B.”

Additionally, the use of the terms “first,” “second,” “third,” etc., are not necessarily used herein to connote a specific order or number of elements. Generally, the terms “first,” “second,” “third,” etc., are used to distinguish between different elements as generic identifiers. Absence a showing that the terms “first,” “second,” “third,” etc., connote a specific order, these terms should not be understood to connote a specific order. Furthermore, absence a showing that the terms first,” “second,” “third,” etc., connote a specific number of elements, these terms should not be understood to connote a specific number of elements. For example, a first widget may be described as having a first side and a second widget may be described as having a second side. The use of the term “second side” with respect to the second widget may be to distinguish such side of the second widget from the “first side” of the first widget and not to connote that the second widget has two sides.

All examples and conditional language recited herein are intended for pedagogical objects to aid the reader in understanding the disclosure and the concepts contributed by the inventor to furthering the art, and are to be construed as being without limitation to such specifically recited examples and conditions. Although examples of the present disclosure have been described in detail, it should be understood that the various changes, substitutions, and alterations could be made hereto without departing from the spirit and scope of the present disclosure.

What is claimed is:

1. A voltage regulator, comprising:
- an output node operable to be coupled to a load;
- a pass device operable to pass current to the output node based on a voltage applied to the pass device, wherein the pass device comprises a p-channel transistor;
- a first feedback circuit operable to adjust the voltage applied to the pass device based on an output node voltage, wherein the first feedback circuit comprises an error amplifier and a resistor divider coupled between the output node and an input of the error amplifier; and
- a second feedback circuit operable to adjust the voltage applied to the pass device based on a change to the output node voltage, wherein the second feedback circuit comprises a capacitor coupled in parallel with a resistor of the resistor divider.

2. The voltage regulator of claim 1, wherein the first feedback circuit comprises a first resistor, a second resistor, and an amplifier, and wherein the first feedback circuit is operable to generate voltage feedback to be input to the amplifier using the first resistor and the second resistor.

3. The voltage regulator of claim 1, wherein the second feedback circuit is operable to facilitate a reduced impedance at the output node by using a voltage follower.

4. The voltage regulator of claim 1, wherein the second feedback circuit is operable to facilitate a dominant pole for the voltage regulator that has increased stability in response to a load change.

5. The voltage regulator of claim 1, wherein the second feedback circuit is operable to adjust the output node based on an output voltage from the first feedback circuit and the change to the output node voltage.

6. The voltage regulator of claim 1, wherein the second feedback circuit comprises an alternating current (AC) feedback loop facilitating dynamic current to increase a transient response of the voltage regulator.

7. The voltage regulator of claim 1, further comprising a circuit comprising:
- one or more of a capacitor or a resistor,
- wherein the circuit is operable to increase a phase margin of the voltage regulator based on one or more of a dominant pole for the voltage regulator or a zero for the voltage regulator.

8. The voltage regulator of claim 1, further comprising a circuit comprising one or more transistors in a mirror configuration to facilitate one or more of: an increased transient response for the voltage regulator, or an increased power supply rejection ratio (PSRR) for the voltage regulator to match the PSRR when an n-channel transistor is used at the pass device.

9. A voltage regulator comprising:
- an output node operable to be coupled to a load;
- a pass device operable to pass current to the output node based on a voltage applied to the pass device, wherein the pass device comprises a p-channel transistor;
- a first feedback circuit operable to adjust the voltage applied to the pass device based on an output node voltage, wherein the first feedback circuit comprises an error amplifier and a resistor divider coupled between the output node and an input of the error amplifier;
- a second feedback circuit operable to reduce an impedance of the output node by using a voltage follower; and
- a circuit operable to increase a phase margin of the voltage regulator.

10. The voltage regulator of claim 9, wherein the first feedback circuit comprises a first resistor, a second resistor, and an amplifier.

11. The voltage regulator of claim 9, wherein the second feedback circuit comprises a voltage follower.

12. The voltage regulator of claim 9, wherein the second feedback circuit comprises an alternating current (AC) feedback loop.

13. The voltage regulator of claim 9, wherein the circuit comprises one or more of a capacitor or a resistor.

14. The voltage regulator of claim 9, wherein the circuit comprises one or more transistors in a mirror configuration.

15. A voltage regulator, comprising:

an output node operable to be coupled to a load;

a pass device operable to pass current to the output node based on a voltage applied to the pass device, wherein the pass device comprises a pass device p-channel transistor; and a first feedback circuit operable to adjust a voltage output to the pass device based on an output node voltage, wherein the first feedback circuit comprises an error amplifier and a resistor divider coupled between the output node and an input of the error amplifier;

a second feedback circuit comprising a second feedback circuit first n-channel transistor and a second feedback circuit second n-channel transistor, wherein the second feedback circuit is operable to reduce an impedance of the output node by using a voltage follower; and a circuit comprising one or more circuit transistors in a mirror configuration to increase one or more of a power supply rejection ratio (PSRR) bandwidth or a transient response of the voltage regulator.

16. The voltage regulator of claim 15, wherein the one or more circuit transistors comprise one or more circuit p-channel transistors and one or more circuit n-channel transistors.

17. The voltage regulator of claim 15, wherein the one or more circuit transistors comprise a circuit first p-channel transistor and a circuit first mirrored p-channel transistor that are operable to input current to one or more of the pass device p-channel transistor or the second feedback circuit first n-channel transistor.

18. The voltage regulator of claim 15, wherein the one or more circuit transistors comprise a circuit first n-channel transistor and a circuit first mirrored n-channel transistor that are operable to receive current from the second feedback circuit first n-channel transistor.

19. The voltage regulator of claim 15, wherein the one or more circuit transistors comprise:

a circuit first p-channel transistor operable to direct an input current to the second feedback circuit second n-channel transistor, and a circuit first n-channel transistor operable to direct an output current from the second feedback circuit second n-channel transistor, wherein the output current to the input current has a ratio greater than 1.0.

20. The voltage regulator of claim 19, wherein the ratio of the output current to the input current is selected to direct current to the second feedback circuit second n-channel transistor from the pass device p-channel transistor.

* * * * *